(12) United States Patent
Collins et al.

(10) Patent No.: US 8,100,122 B2
(45) Date of Patent: Jan. 24, 2012

(54) SOLAR ROOF TRACKER

(76) Inventors: Kenneth D. Collins, San Diego, CA (US); Foster D. Collins, San Diego, CA (US)

(*) Notice: Subject to any disclaimer, the term of this patent is extended or adjusted under 35 U.S.C. 154(b) by 341 days.

(21) Appl. No.: 12/368,925

(22) Filed: Feb. 10, 2009

(65) Prior Publication Data

US 2009/0199846 A1    Aug. 13, 2009

Related U.S. Application Data

(60) Provisional application No. 61/027,614, filed on Feb. 11, 2008, provisional application No. 61/027,617, filed on Feb. 11, 2008.

(51) Int. Cl.
    *F24J 2/46* (2006.01)
(52) U.S. Cl. .................... 126/623; 126/601
(58) Field of Classification Search ............... 126/623, 126/601; 136/243–251
    See application file for complete search history.

(56) References Cited

U.S. PATENT DOCUMENTS

| | | | |
|---|---|---|---|
| 4,064,865 A | 12/1977 | Depew | |
| 4,108,019 A | 8/1978 | Martin | |
| 4,178,913 A | 12/1979 | Hutchison | |
| 4,258,698 A | 3/1981 | Sales | |
| 4,289,118 A | 9/1981 | Stark | |
| RE30,960 E | 6/1982 | Sommer | |
| 4,371,139 A * | 2/1983 | Clark | 248/237 |
| 4,429,952 A * | 2/1984 | Dominguez | 359/591 |
| 4,565,185 A | 1/1986 | Mori | |
| 4,585,318 A * | 4/1986 | Seifert | 353/3 |
| 4,620,771 A * | 11/1986 | Dominguez | 359/591 |
| 4,634,086 A | 1/1987 | Mori | |
| 4,930,493 A | 6/1990 | Sallis | |
| 4,968,355 A | 11/1990 | Johnson | |
| 5,228,924 A * | 7/1993 | Barker et al. | 136/246 |
| 6,079,408 A | 6/2000 | Fukuda | |
| 6,080,927 A * | 6/2000 | Johnson | 136/248 |
| 6,809,253 B2 * | 10/2004 | Dinwoodie | 136/251 |
| 6,820,611 B2 | 11/2004 | Kinoshita | |
| 6,945,246 B2 | 9/2005 | Kinoshita | |
| 7,192,146 B2 | 3/2007 | Gross et al. | |

\* cited by examiner

*Primary Examiner* — Steven B McAllister
*Assistant Examiner* — Sarah Suereth
(74) *Attorney, Agent, or Firm* — Stephen C. Beuerle; Procopio Cory Hargreaves & Savitch LLP

(57) ABSTRACT

A solar tracking system for mounting on a roof having one or more rooftop planar surfaces includes an array of solar tracking assemblies for at least one of the one or more rooftop planar surfaces, each array of solar tracking assemblies mountable at substantially the same orientation on the rooftop planar surface, each solar tracking assembly including a mounting structure, a steering mechanism, and one or more energy converting units that convert solar energy into electrical energy, the steering mechanism supported at least in part by the mounting structure and the one or more energy converting units steered by the steering mechanism; a drive mechanism that drives multiple steering mechanisms of the array of solar tracking assemblies; and a control processor that controls the drive mechanism so that the one or more energy converting units follow the sun.

10 Claims, 10 Drawing Sheets

FIG. 4 (section view)

SOLAR ROOF TRACKER

CROSS-REFERENCE TO RELATED APPLICATION

This application claims the benefit of provisional patent application Nos. 61/027,614 and 61/027,617, each filed Feb. 11, 2008, under 35 U.S.C. 119(e). These provisional patent applications are incorporated by reference herein as though set forth in full.

BACKGROUND OF THE INVENTION

Roof-mounted photovoltaic panels have been in use for many years. The photovoltaic panels are usually mounted onto a roof of a building at a fixed angle. The photovoltaic panels are mounted to the roof at a location and an angle that attempts to maximize the capture and conversion of solar energy into electrical energy given the particular orientations and pitch angles of the available roof sections. It is known that photovoltaic panels produce more electrical energy when they are dynamically steered in one or preferably two axis so that the panels are perpendicular to the sun for more hours during each day. A problem recognized by the inventors is that most currently available photovoltaic panel steering systems are too large and/or too heavy to be cost-effectively mounted on most roofs, which often have odd shapes, view obstruction restrictions, and minimal structural and/or regulatory margins for added weight.

SUMMARY OF INVENTION

The inventors of the present invention have recognized that multiple rooftop-mounted photovoltaic systems that move and track the sun's relative movement through the sky are much more efficient at capturing and converting solar energy into electrical energy than these fixed roof-mounted photovoltaic panels.

Accordingly, an aspect of the invention involves a solar tracking and mounting system for two-dimensional arrays of small to medium sized photovoltaic panels ideally suited for installation on the pitched or the flat roofs of residential houses or industrial buildings. The solar tracking and mounting system includes a plurality of solar tracking assemblies that carry the photovoltaic panels and slowly steer the panels to more often directly face the sun as it moves across the sky daily and through the annual seasons. As a result, the solar tracking and mounting system creates significantly more electricity from the sunlight than if the panels were mounted in a fixed position. The solar tracking assemblies are interconnected in a modular and adaptable fashion which allows installations to be configured in different shapes and inter-panel spacing depending on size, pitch, and orientation of each roof surface and any roof penetrations or obstructions that it might have.

Another aspect of the invention involves a solar tracking system for mounting on a roof having one or more rooftop planar surfaces. The solar tracking system includes an array of solar tracking assemblies for at least one of the one or more rooftop planar surfaces, each array of solar tracking assemblies mountable at substantially the same orientation on the rooftop planar surface, each solar tracking assembly including a mounting structure, a steering mechanism, and one or more energy converting units that convert solar energy into electrical energy, the steering mechanism supported at least in part by the mounting structure and the one or more energy converting units steered by the steering mechanism; a drive mechanism that drives multiple steering mechanisms of the array of solar tracking assemblies; and a control processor that controls the drive mechanism so that the one or more energy converting units follow the sun.

One or more implementations of the aspect of the invention described immediately above includes one or more of the following: The control processor is programmed to drive the drive mechanism so that the one or more energy converting units follow the sun, the control processor is programmed based on calculations based on one or more of location, orientation, roof pitch, and other installation parameters; the roof includes a roof support structure, and the mounting structure at least partially supports the solar tracking assembly and connects to the roof support structure; the steering mechanism includes two-axis steering of the one or more energy converting units; the steering mechanism is configured to steer the one or more energy converting units into a position so that the one or more energy converting units are planar with the the rooftop planar surface; the solar tracking system further includes a wind sensor that senses a high-wind condition in communication with the control processor, and the control processor drives the drive mechanism so that the one or more energy converting units are steered to a position so that the one or more energy converting units are planar with the the rooftop planar surface upon detection of a high-wind condition; the drive mechanism includes multiple elongated shafts extending between solar tracking assemblies and imparting movement on the multiple steering mechanisms of the array of solar tracking assemblies to steer the one or more energy converting units; the multiple elongated shafts define a plane that is planar with the the rooftop planar surface; the solar tracking system is mountable on both pitched and flat roofs of houses and buildings; the solar tracking assemblies are interconnected in a modular adaptable fashion, allowing installations to be configured in different shapes depending on one or more of the roof configuration, roof penetrations, and roof obstructions; and/or the solar tracking system includes multiple arrays of solar tracking assemblies, one array for each rooftop planar surface.

Other and further objects, features, aspects, and advantages of the present inventions will become better understood with the following detailed description of the accompanying drawings.

DETAILED DESCRIPTION OF THE PREFERRED EMBODIMENTS

With reference to FIGS. 1-6, an embodiment of a rooftop solar tracking and mounting system 50 will be described. The rooftop solar tracking and mounting system 50 will be shown and described as being mounted onto a pitched rooftop 60 of a residential house 70, on the most favorably sun-facing sections of the rooftop 60. In one or more embodiments, the rooftop solar tracking and mounting system 50 is mounted onto a pitched, flat, or curved rooftop of a house, commercial building, or other building. In further embodiments, the solar tracking and mounting system 50 is mounted onto the ground or pitched, flat, or curved structure(s) other than a house or building.

The rooftop solar tracking and mounting system 50 includes a plurality of individual solar tracking assemblies 80 interconnected by a fixed upper lattice assembly 85 and a lower movable lattice assembly 90.

Figure 2:
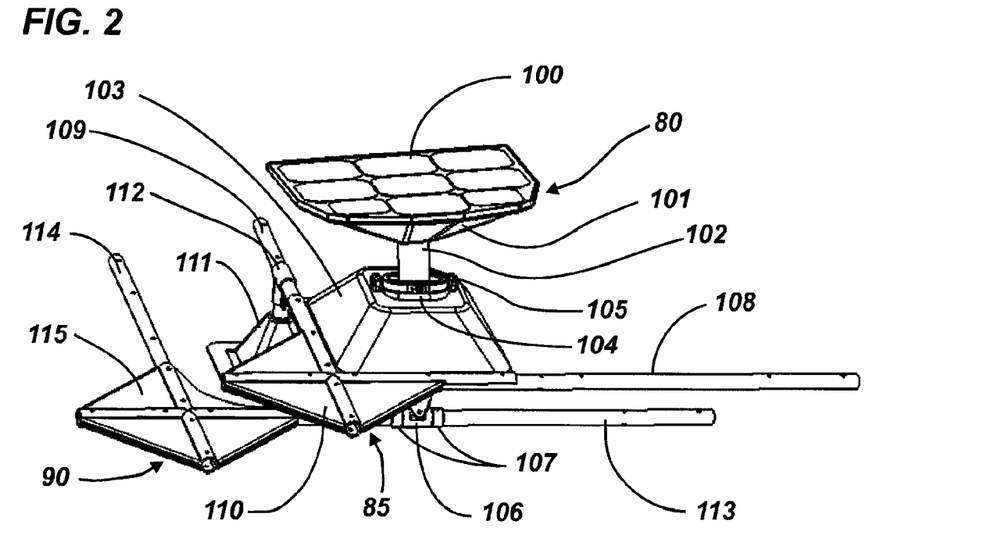
FIG. 2 is a first perspective view of an embodiment of an individual solar tracking assembly.
Figure 3:
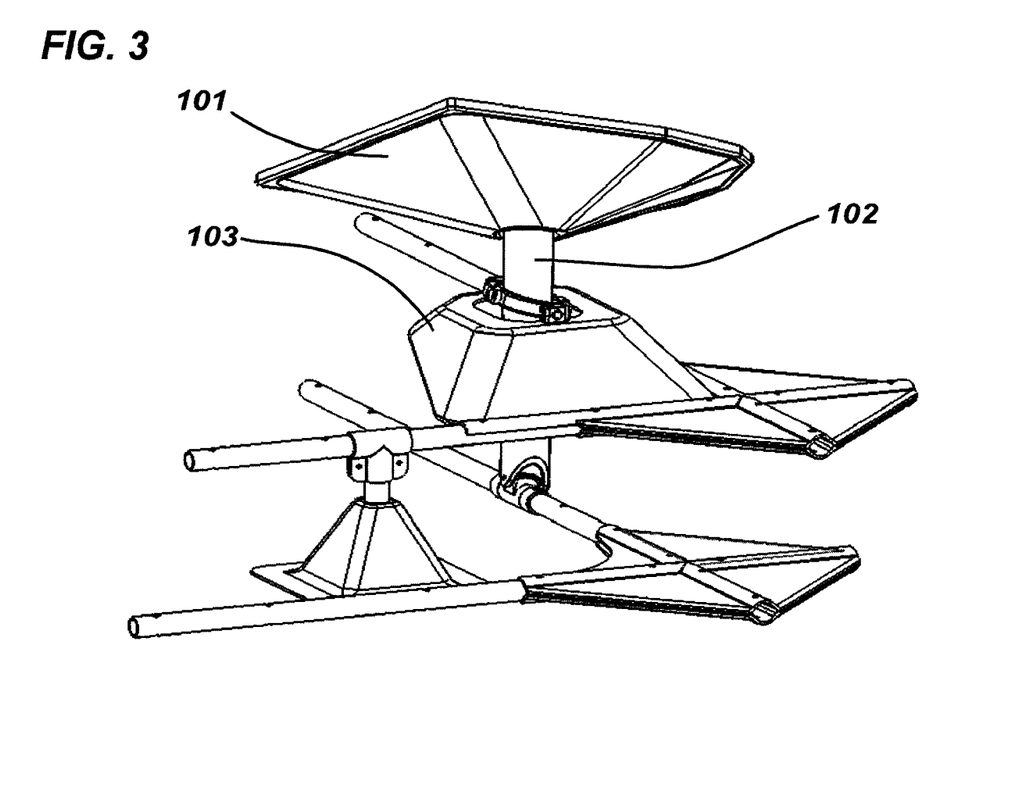
FIG. 3 is a second perspective view of the individual solar tracking assembly shown in FIG. 2.
Figure 4:
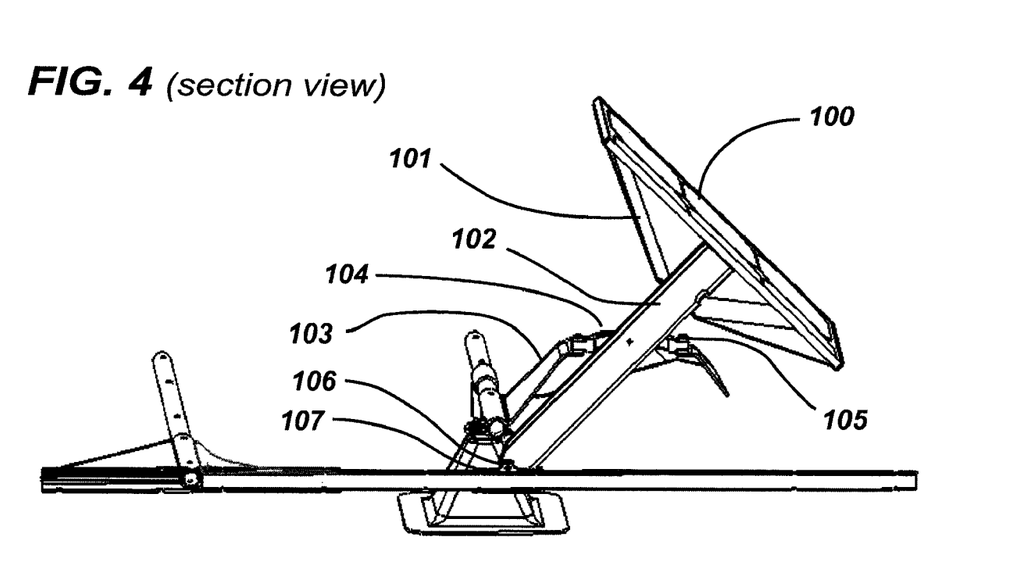
FIG. 4 is a partial perspective sectional view of the individual solar tracking assembly shown in FIG. 2.
Figure 5:
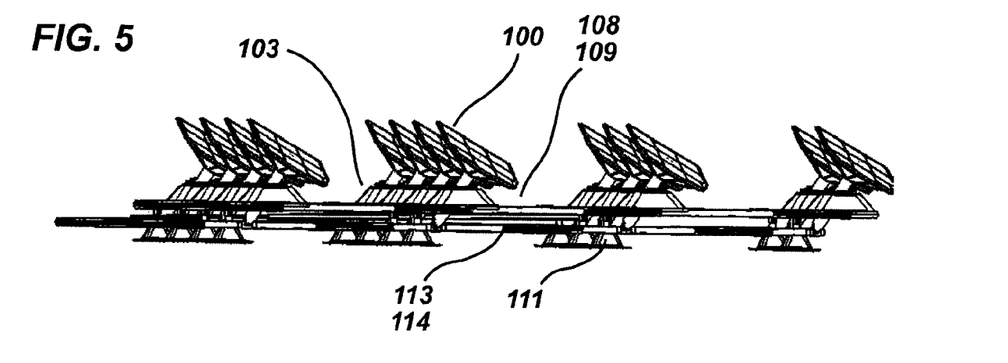
FIG. 5 is a side-elevational view of a portion of the solar tracking and mounting system shown in FIG. 1.

Each solar tracking assembly 80 includes a plurality of small to medium sized photovoltaic panels 100 mounted within or to a panel mounting structure 101 made of plastic or metal. Although the solar tracking systems are described herein as including one or more photovoltaic (PV) panels/cells, in one or more embodiments, photovoltaic (PV) panel(s)/cell(s) or other types of energy converting unit(s) that convert solar energy into electrical energy may be used. Examples of energy converting unit(s) used in one or more embodiments of the solar tracking systems include, but not by way of limitation, photovoltaic cell(s), thermal-solar cell(s), concentrating cell(s), or other unit(s) that convert solar energy into electrical energy.

The panel mounting structure 101 is connected to a hollow panel mounting pole 102 made of plastic or metal. The wires from each panel 100 are routed down through the hollow panel mounting pole 102 and then routed, strapped or otherwise secured along sections of the upper lattice assembly 85 and/or the lower movable lattice assembly 90 with slack flexing/service loops as appropriate. The panel mounting pole 102 extends through and is movable within a central hole of a fixed pole pivot frame 103. About halfway along the length of the panel mounting pole 102, the panel mounting pole 102 is rotatably coupled to an upper pole universal joint 104 for rotation about two axes—a first axis and a second axis. The panels 100 are locked in rotation, but are free to pitch and tilt in the two axes. The first axis of rotation and the second axis of rotation are perpendicular to each other. The upper pole universal joint 104 is mounted near a top of the pole pivot frame 103 via a upper pole universal joint bearing mount 105.

At a lower end of the panel mounting pole 102, the panel mounting pole 102 is rotatably coupled for rotation about a third axis and a fourth axis to a lower pole universal joint 106. The third axis of rotation and the fourth axis of rotation are perpendicular to each other. The first axis of rotation and the third axis of rotation are parallel to each other. Similarly, the second axis of rotation and the fourth axis of rotation are parallel to each other. The lower pole universal joint 106 is slip fit over the lower lattice dailly connecting member 113 and is held axially in place with one lower pole universal joint retainer 107 on either side of it.

The fixed upper lattice assembly 85 includes a plurality of fixed interconnected upper lattice daily connecting members 108 and upper lattice season connecting members 109 connected at right angles to each other at upper lattice intersection plates 110. The upper lattice intersection plates 110 may be integral with or separate from pole pivot frame 103. The fixed upper lattice assembly 85 is supported on the roof 60 by upper lattice roof mounts 111 and upper lattice roof mount connectors. One or more of the upper lattice roof mounts 111 may be connected to the roof 60 for securing the rooftop solar tracking and mounting system 50 to the roof 60. All of these upper parts are held stationary with respect to the roof surface 60 by the upper lattice roof mount connector 112 and the upper lattice roof mount 111. The upper lattice roof mount 111 may have a flat base as shown or might have an interface for mounting to other types of roof mounts (not shown).

In a further embodiment, another rigid lattice affixed to the bases of the upper lattice roof mounts 111 is added such that the entire array assembly becomes a rigid structure which then only needs to be anchored to the roof 60 in a few places.

The lower movable lattice assembly 90 includes a plurality of interconnected lower lattice daily connecting members 113 and lower lattice season connecting members 114 connected at right angles to each other at lower lattice intersection plates 115.

Figure 6:
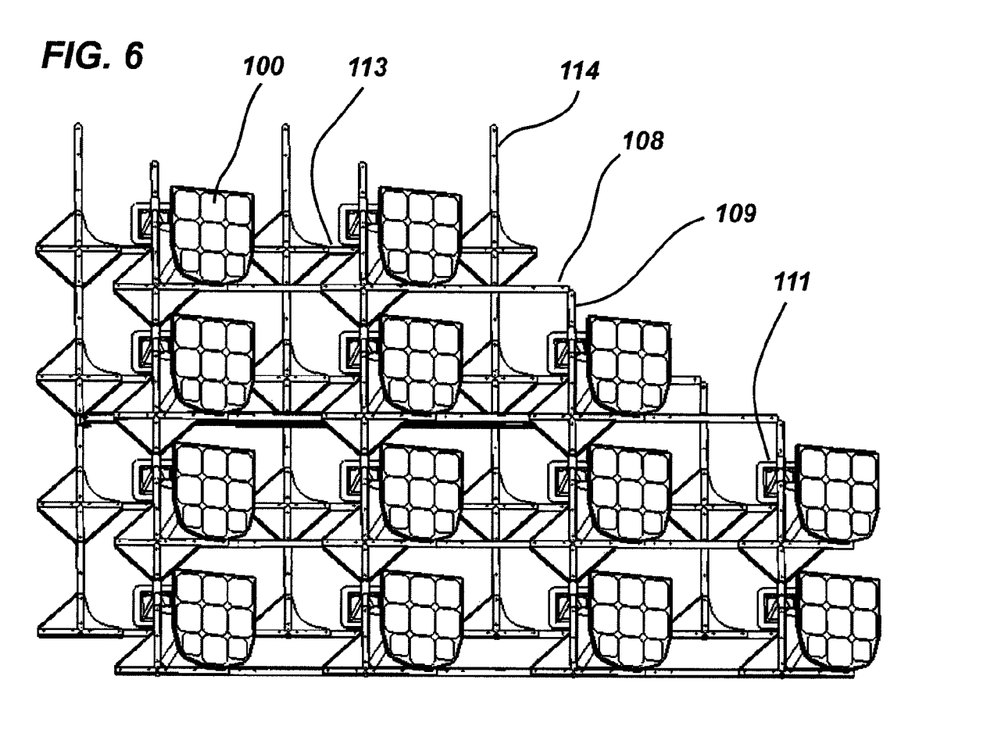
FIG. 6 is a top plan view of a portion of the solar tracking and mounting system shown in FIG. 1.

An embodiment of a linearly actuating daily drive mechanism subassembly 116 is shown in FIG. 6. The daily drive mechanism subassembly 116, which is controlled by control electronics/computer 120, imparts movement to the lower movable lattice assembly 90 in the direction of the arrows shown in the lower-left corner of FIG. 6 (along the longitudinal direction of lower lattice daily connecting members 113).

Similarly, an embodiment of a linearly actuating seasonal drive mechanism subassembly 117 is shown in FIG. 6. The seasonal drive mechanism subassembly 117, which is controlled by control electronics/computer 120, imparts movement to the lower movable lattice assembly 90 in the direction of the arrows shown in the upper part of FIG. 6 (along the longitudinal direction of lower lattice season connecting members 114).

The control electronics/computer 120 has programmed into its permanent memory (or stored in other memory) the motor command positions for each day of the year to cause motors of the drive mechanism subassemblies 116, 117 to move the lower movable lattice assembly 90 to cause the panels 100 to be pointing directly at the sun as much as is mechanically possible during the course of each day and over the course of each year. Alternatively, the control electronics/computer could monitor any of several different classes of sensors to provide a conventional closedloop control circuit to cause the drive mechanisms to steer the panel directly at the sun.

Movement of the lower movable lattice assembly 90 causes the panel mounting pole 102 to rotate about the second axis of the upper pole universal joint 104 and the fourth axis of the lower pole universal joint 106. The controlled combination of movements of the drive mechanism assemblies 116, 117 causes the solar collector panels 100 to be oriented so that they are directed at the sun throughout the course of each day of the year.

By interconnecting and joining upper lattice and lower lattice connectors, arrays of panels 100 can built. The upper lattice assembly 85 is rigidly mounted to the roof 60. The lower lattice assembly 90 is held in place by the lower universal joints 106, but is free to be driven laterally by the drive mechanism subassemblies 116, 117 such that all of the panels 100 steer in unison to track the sun. A scissors parallel bar mechanism (not shown) may be provided between the upper lattice assembly 85 and the lower lattice assembly 90 to maintain parallelism between the lattices.

FIGS. 1, 6, 7, and 10 show how the final shape of the rooftop solar tracking and mounting system 50 is easily adaptable for a variety of different roof configurations, a variety of different pitched roofs, and to accommodate a variety of different obstructions (e.g., chimney) 119 on a roof as needed per each installation. The solar tracking assemblies 80 are interconnected in a modular adaptable fashion that allows installations to be configured in different shapes depending on each roof 60 and any roof penetrations or obstructions 119 that the roof 60 may have.

Figure 1:
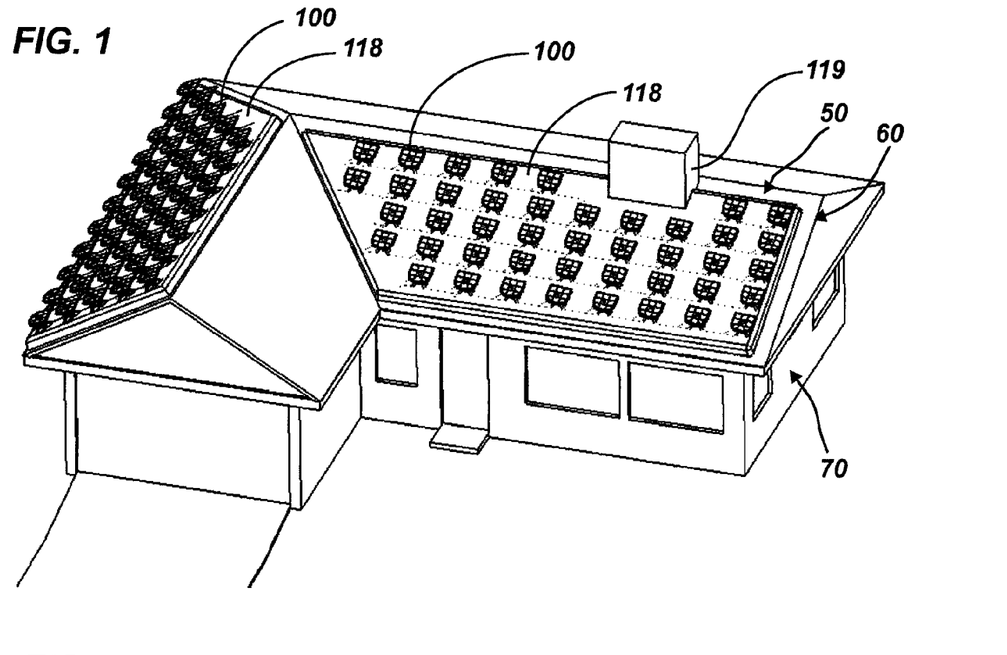
FIG. 1 is a perspective view of an embodiment of a solar tracking and mounting system shown on a roof of a residential house.

Optionally, as shown in FIG. 1, a soft flexible cover 118 made of a non-water trapping material (e.g., fabric screening fastened with Velco fasteners or snaps) is provided in modular pieces and assembled to cover the interconnecting mechanisms such that primarily only the solar panels 100 are visible to neighbors and others passing by the house 70.

With reference to FIGS. 7-12, another embodiment of a rooftop solar tracking and mounting system 150 will be described. The rooftop solar tracking and mounting system 150 will be shown and described as being mounted onto a pitched rooftop 160 of a residential house 170, on the most favorably sun-facing sections of the rooftop 160. In one or more embodiments, the rooftop solar tracking and mounting system 150 is mounted onto a pitched, flat, or curved rooftop of a house, commercial building, or other building. In further embodiments, the solar tracking and mounting system 150 is mounted onto the ground or pitched, flat, or curved structure (s) other than a house or building.

The rooftop solar tracking and mounting system 150 includes a plurality of individual solar tracking assemblies 180 interconnected by lower seasonal torque rod interconnections 185 and upper daily torque rod interconnections 190.

Figure 8:
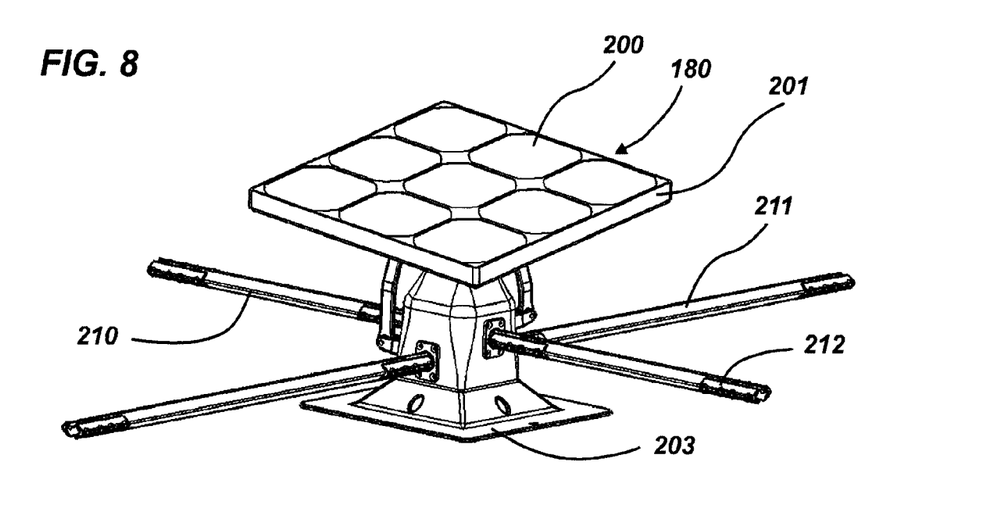
FIG. 8 is a first perspective view of an embodiment of an individual solar tracking assembly.
Figure 9:
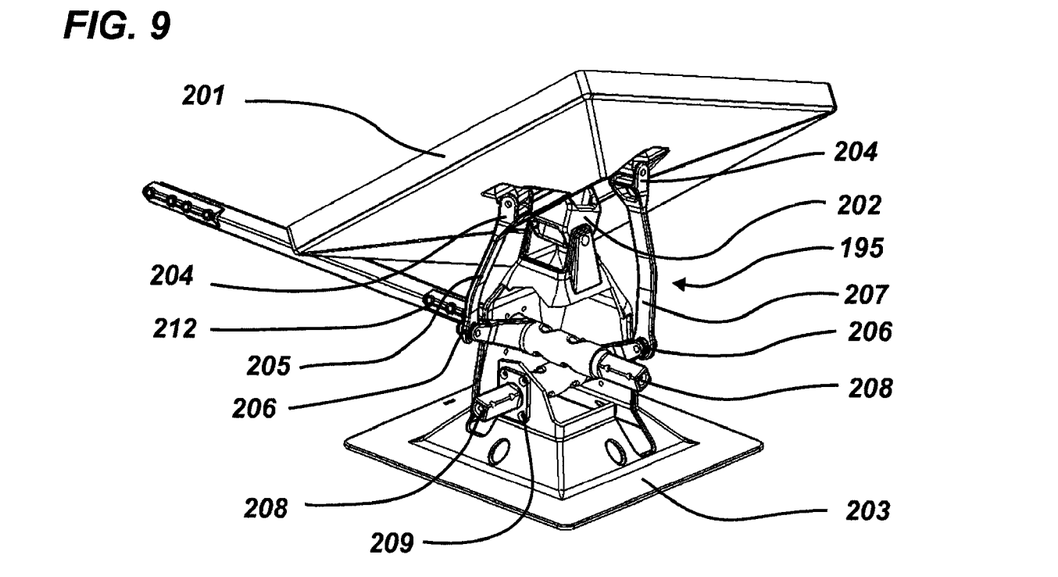
FIG. 9 is a second perspective view of the individual solar tracking assembly shown in FIG. 8.

Each solar tracking assembly 180 includes a plurality of small to medium sized photovoltaic panels 200 mounted rigidly within or to a panel mounting structure 201 made of plastic or metal. The panel mounting structure 201 may have an optional offset adjustment feature or part (not shown) which would compensate for a bias/offset angle of a particular roof surface 160. The panel mounting structure 201 is supported by a pedestal 203. The panel mounting structure 201 is operably coupled to a top of the pedestal by a primary universal joint 202, which restricts the panel mounting structure 201 from complete rotation while allowing it to pivot approximately +/−45 degrees in the daily and seasonal axes. The wires from each panel 200 are routed down through the primary universal joint 202 and then routed, loosely strapped or otherwise secured along sections of connecting torque rods 210, 211 with slack flexing/service loops as appropriate.

In a further embodiment, another rigid lattice is affixed to the the bases of the pedestal roof mounts 203 such that the entire array assembly becomes a rigid structure which then only needs to be anchored to the roof in a few places.

The panel mounting structure 201 is steered by a steering mechanism 195, which causes the panels 200 to steer in the daily axis when a daily/upper connecting torque rod 210 is rotated and to steer in the seasonal axis when a seasonal/lower connecting torque rod 211 is rotated. The steering mechanism 195 is carried by and at least partially housed within the pedestal 203, which fastens flat on the roof 160 or may alternatively have a differently shaped base which interfaces with other types of roof mounts.

The steering mechanism 195 includes a daily connecting lever arm 205 and a seasonal connecting lever arm 207. Both arms 205, 207 are respectively operably coupled to panel mounting structure 201 at top ends and lower arm ball joints 206 at bottom ends. The arms 205, 207 are respectively flexibly linked to a rotating lever shaft 208, one for the daily axis and one for the seasonal axis, which is retained by two rotating shaft bearings 209. The rotating lever shafts 208 are connected to their respective connecting torque rods 210, 211 by means of a torque rod connection fitting 212.

Figure 10:
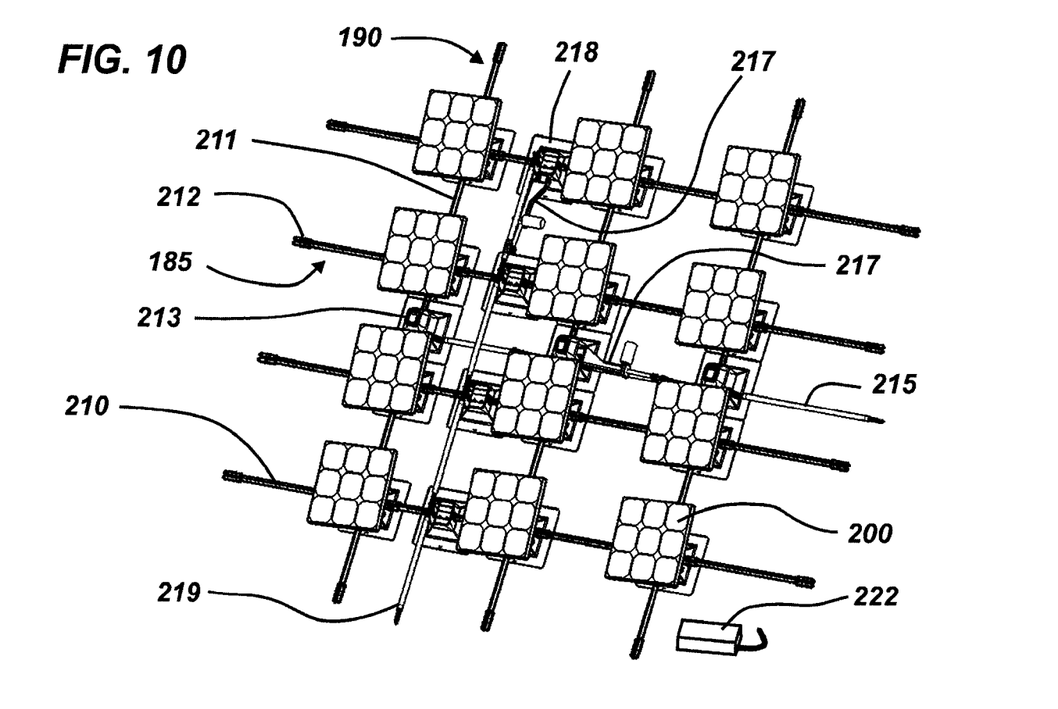
FIG. 10 is a top perspective view of a portion of the solar tracking and mounting system shown in FIG. 7.

As shown in FIG. 10, on a typical rooftop installation, a plurality of solar tracking assemblies 180 are linked together in a modular fashion in the daily and seasonal axes using torque rod connection fittings 212 such that each row of solar tracking assemblies 180 rotate in unison with its neighbors. The daily and seasonal axes each use an extra intermediate line of special pedestals 213, 218 and driver links 215, 219 to interconnect adjacent parallel rows. At some appropriate position along each line of driver links 215, 219, linearly-actuating drive mechanism sub assemblies ("driver actuators") 217 are connected between the pedestal 213, 218 and one of the driver links 215, 219 to generate the motions in each axis.

Figure 11:
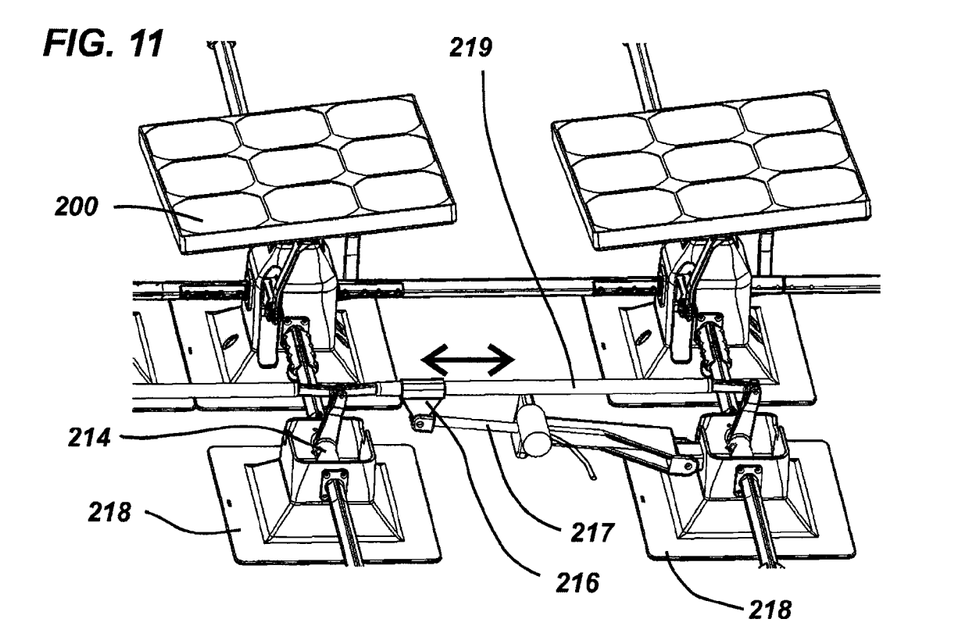
FIG. 11 is a perspective view of a pair of solar tracking assemblies and shows an embodiment of the seasonal axis drive line detail for the solar tracking and mounting system.

With reference to FIG. 11, seasonal axis drive line detail will be described. The driver actuator 217 connects between a season/lower driver pedestal 218 and a driver connection tang 216 so that when the driver actuator 217 linearly extends or retracts, it causes all the rows of lower/seasonal connecting torque rods 211 to rotate in unison, which in turn causes the steering mechanisms 195 of the solar tracking assemblies 180 to steer all of the panels 200 of the respective solar tracking assemblies 180 to move in unison in the seasonal axis.

Figure 12:
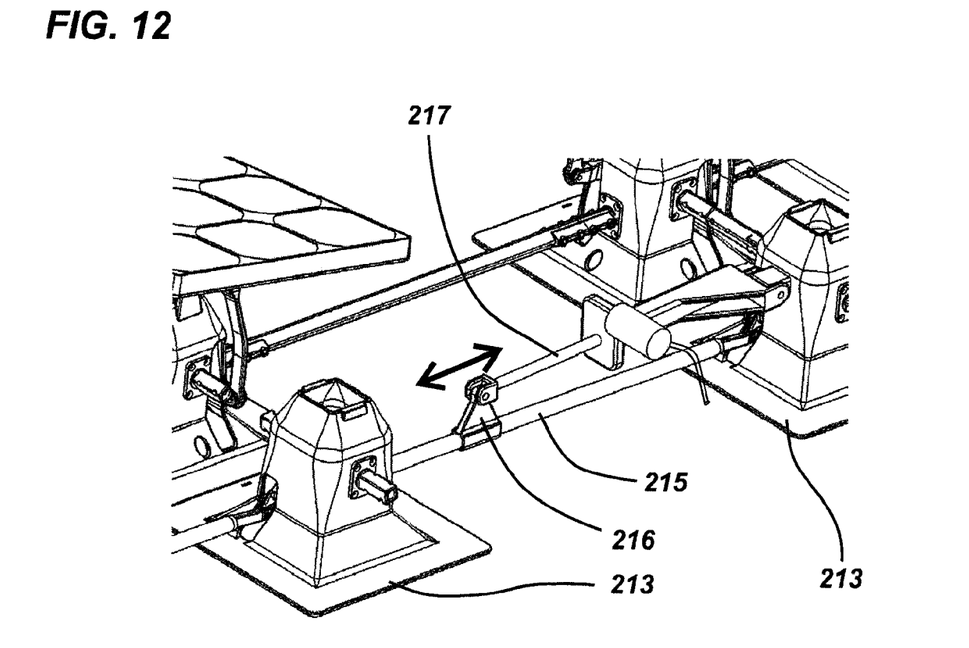
FIG. 12 is a perspective view of an embodiment of the daily axis drive line detail for the solar tracking and mounting system.

With reference to FIG. 12, daily axis drive line detail will be described. Similar to the seasonal axis drive line, in the daily axis drive line, a driver actuator 217 connects between a daily/upper driver pedestal 213 and a driver connection tang 216 so that when the driver actuator 217 linearly extends or retracts, it causes all the rows of daily/upper connecting torque rods 210 to rotate in unison, which in turn causes the steering mechanisms 195 of the solar tracking assemblies 180 to steer all of the panels 200 of the respective solar tracking assemblies 180 to move in unison in the daily axis.

The control electronics/computer 222 has programmed into its permanent memory (or stored in other memory) the motor command positions for each day of the year to cause motors to drive the driver actuators 217 to cause the rows of connecting torque rods 210, 211 to rotate, which in turn causes the steering mechanisms 195 of the solar tracking assemblies 180 to steer the panels 200 of the respective solar tracking assemblies 180 so that the panels point directly at the sun as much as is mechanically possible during the course of each day and over the course of each year. Alternatively, the control electronics/computer could monitor any of several different classes of sensors to provide a conventional closed-loop control circuit to cause the drive mechanisms to steer the panel directly at the sun.

FIGS. 1 and 6 show how the final shape of the rooftop solar tracking and mounting system 150 is easily adaptable for a variety of different roof configurations, a variety of different pitched roofs, and to accommodate a variety of different obstructions (e.g., chimney) 221 on a roof 160 as needed per each installation. The solar tracking assemblies 180 are interconnected in a modular adaptable fashion that allows installations to be configured in different shapes depending on each roof 160 and any roof penetrations or obstructions 221 that the roof 160 may have.

Figure 7:
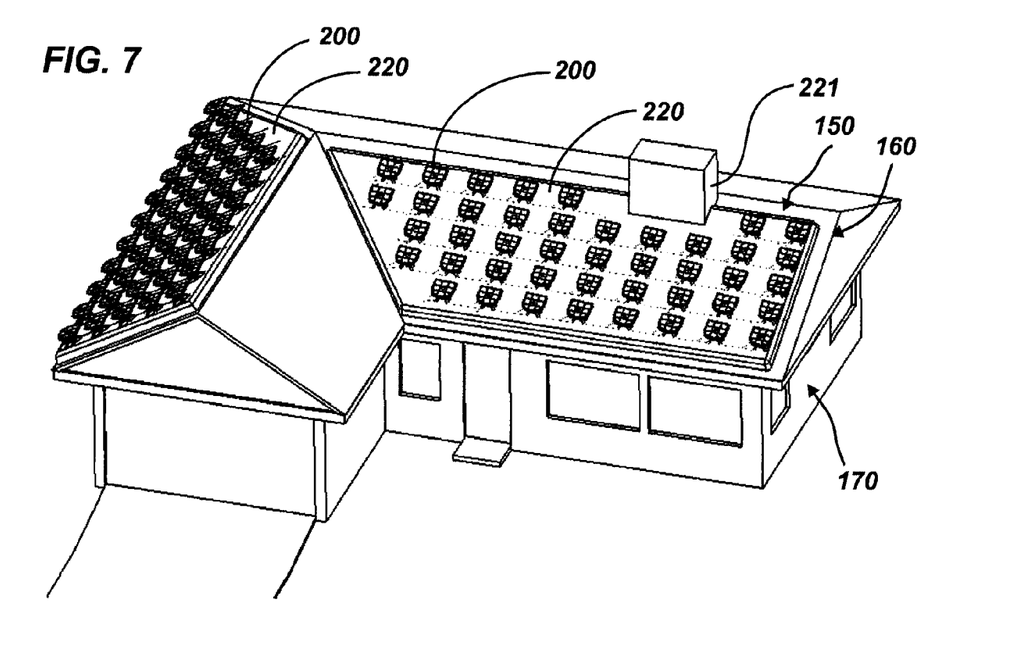
FIG. 7 is a perspective view of another embodiment of a solar tracking and mounting system shown on a roof of a residential house.

Optionally, as shown in FIG. 7, a soft flexible cover 220 made of a non-water trapping material (e.g., fabric screening fastened with Velco fasteners or snaps) is provided in modular pieces and assembled to cover the interconnecting mechanisms such that primarily only the solar panels 200 are visible to neighbors and others passing by the house 170.

With reference to FIGS. 13-18, a further embodiment of a rooftop solar tracking and mounting system 300 will be described. The rooftop solar tracking and mounting system 300 will be shown and described as being mounted onto a pitched rooftop 303 of a residential house, on the most favorably sun-facing sections of the rooftop 303. In one or more embodiments, the rooftop solar tracking and mounting system 300 is mounted onto a pitched, flat, or curved rooftop of a house, commercial building, or other building. In further embodiments, the solar tracking and mounting system 300 is mounted onto the ground or pitched, flat, or curved structure (s) other than a house or building.

Figure 13:
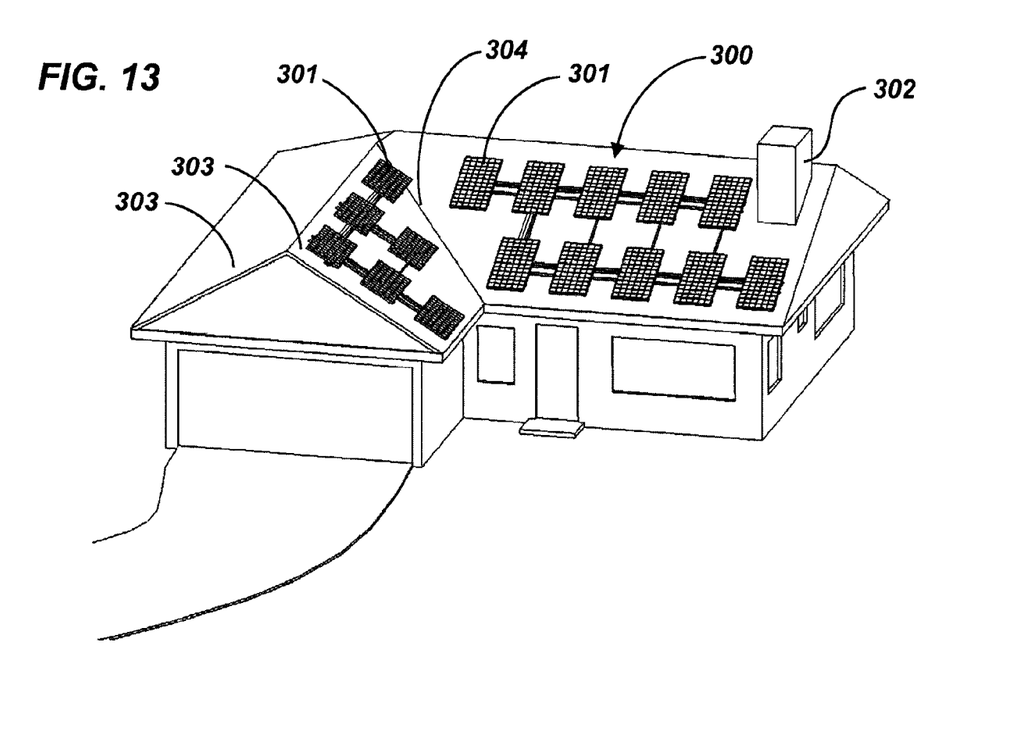
FIG. 13 is a perspective view of a further embodiment of a solar tracking and mounting system shown on a roof of a residential house.

With reference to FIG. 13, the rooftop solar tracking and mounting system 300 is a referred to as lay-down-flat solar roof tracker. The rooftop solar tracking and mounting system ("system") 300 is a two-axis solar tracking and mounting system for standard-size photovoltaic PV panels 301. The panels 301 shown are standard 32"×62" panels which might nominally rated at approximately 200 watts of output power. In one or more alternative embodiments, the system 300 includes panels 301 that are 50% to 125% of the size of standard 32"×62" panels. In an alternative embodiment, instead of 32"×62" panels, individual PV cells (e.g., 6 in.×6 in.) are provided for each solar tracking assembly of the system (i.e., system 300 includes multiple small solar tracking assemblies, each carrying a PV cell).

The system 300 is ideally suited for installation on the pitched or flat roofs of residential houses or industrial buildings. By slowly steering the panels 301 to more often directly face the sun as it moves across the sky daily and through the annual seasons, significantly more electricity is created from the sunlight than if the panels 301 were mounted in a fixed position. The panel steering mechanisms, which also serve as the panel mounting structural interface to the roof 303, are interconnected in a modular adaptable fashion which allows installations to be configured for different numbers, brands, and types of PV panels in checkerboard patterns of different shapes depending on each system's energy requirements, roof shape, tilt, and orientation, and any roof penetrations or obstructions (e.g., chimney) 302 that it might have. FIG. 13 shows how the panel pattern might be adapted for a residential roof with angled ends 304 of the roof faces. Optionally, a soft flexible cover (not shown) could also be provided in modular pieces such that it can be assembled to cover the interconnecting mechanisms such that primarily only the solar panels are visible to passersby.

Figure 17:
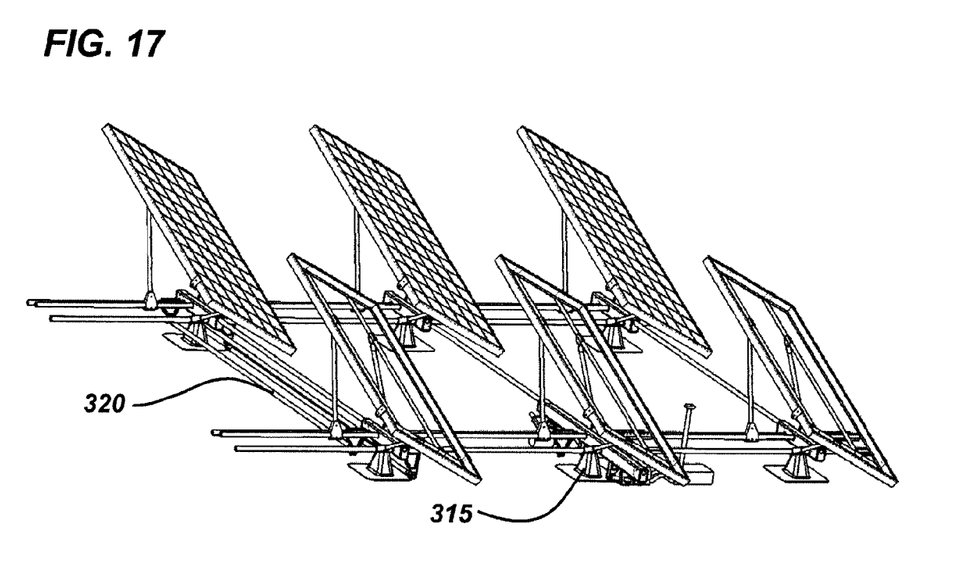
FIG. 17 is a perspective view of an embodiment of a group of solar tracking assemblies of the system illustrated in FIG. 13, and shows the solar tracking assemblies raised/angled for a typical morning tilt orientation.
Figure 18:
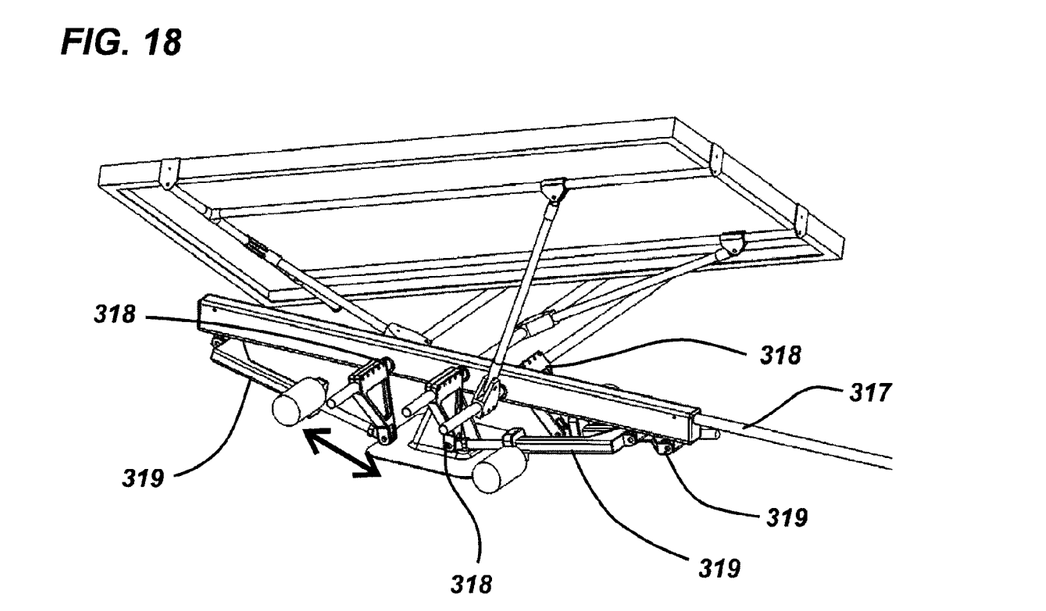
FIG. 18 is a perspective view of an embodiment of a solar tracking assembly of the system illustrated in FIG. 13, and shows details of a driving bearing beam assembly with a panel tilted for a typical afternoon (northern hemisphere) sun.

The system 300 has enough dynamic tilt range (e.g., FIG. 18 compared to FIG. 14) to improve solar panel efficiency by at least partially tilting towards the sun even when installed on one or more pitched roof surfaces 303 not oriented in the ideal direction (i.e., not facing south for northern latitude installations). FIG. 17 shows a group of solar tracking assemblies shown with the PV panels 301 tilted at an extreme angle by the 3-point lift for a typical morning sun position.

Figure 14:
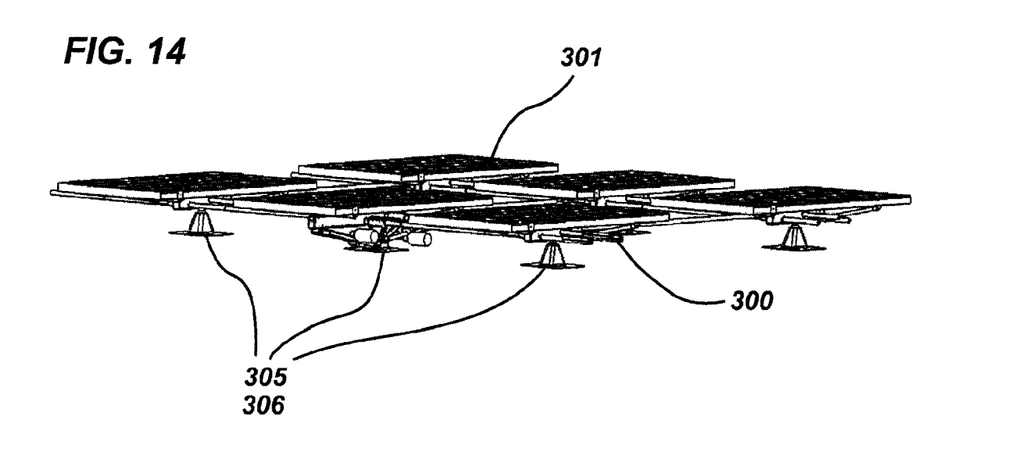
FIG. 14 is a perspective view of an embodiment of a group of solar tracking assemblies of the system illustrated in FIG. 13, and shows the solar tracking assemblies in a low-profile, laying down flat position.

With reference to FIG. 14, the system 300 is shown without a roof 303 to better illustrate how each solar PV panel 301 is adjustably mounted to the panel mounting and control structure in such a way that it can be positioned "flat/down", parallel to the roof surface 303, for maximum strength in excessive wind conditions. This flat position improves visual aesthetic appeal, when high tilt angles relative to the roof 303 are not required for facing the sun. The system 300 is mounted to the roof 303 via many roof mount pedestals or mounts 305 which are typically between 6 and 10 inches high and which fasten and seal with a flashing/cover 306 flat on the roof 303 in a similar fashion to existing fixed solar panel roof mounts. Typically, the mounts 305 are fastened through the roof surface directly into the roof's existing structural members rafters. The spacing of the roof mounts 305 can be based on the roof structure spacing, relatively independently of the spacing between panels 301. Typically, there would not be more than a 6 foot span between mounts 305. Alternatively, mounts 305 could have differently-shaped base which interfaces with other types of roof mounts 305.

Figure 15:
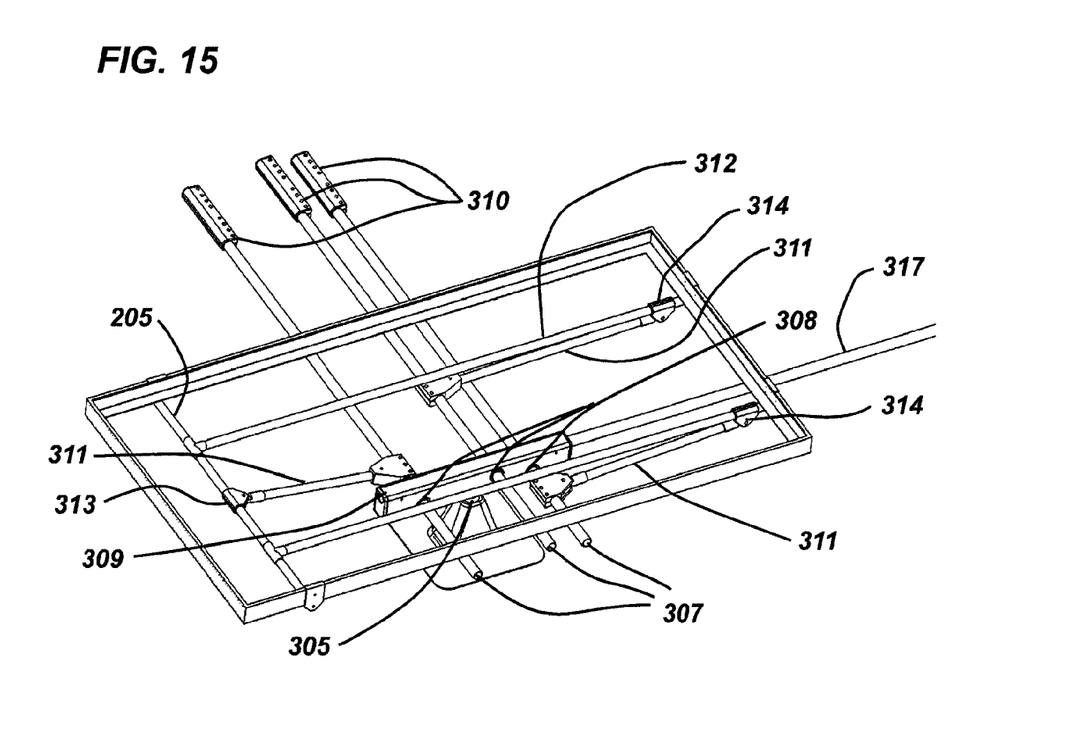
FIG. 15 is a perspective view of an embodiment of a solar tracking assembly of the system illustrated in FIG. 13, and shows the PV panel removed and the basic panel connections to the mounting and rotary-control shafts.

With reference to FIG. 15, an individual solar tracking assembly of the system 300 is shown with the main section of the PV panel 301 removed. Solar tracking control via a steering mechanism will be described. Solar tracking control is actuated by three independently-rotated main shafts 307, which also serve as the primary lateral structure of the assembly. These shafts 307 pass through shaft bearings 308 mounted in bearing beams 309, which are attached to the roof mount pedestals 305. The bearing beams 309 are connected between rows of panels 301 with a row spacer brace 317. The spacing between the bearing beams 309 is somewhat independent of the optimized panel spacing except for making sure there is no interference between attachments to the main shafts 307. Depending on the specific layout, the main shafts 307 can be longer than the spacing between panels 301; since the panel steering mechanisms bolt/clamp to the main shafts 307 at whatever is determined to be the optimum spacing for maximum sun energy collection, taking into account the avoidance of inter-panel shadowing. For long/wide layouts, pipe clamping connectors 310 can be used to join lengths of pipe as needed. For each PV panel 301, three panel lift arms 311 are clamped, one to each of the main shafts 307. A panel pipe frame 312 attaches to the outer frame of the PV panel 301. Slightly different panel pipe frames can be fabricated for each PV panel 301 with different frame sizes. The center lift arm 311 has a universal joint 313 as an attachment to the panel 301. Each of the side arms under each panel 301 attaches to the panel 301 with a slide joint 314. Each of the main shafts 307 has a rotary spring (not shown) pushing against a small torque arm and the bearing beam; so as to act as a counter torque against the weight of the PV panel 301 pushing on the lift arms 311.

Figure 16:
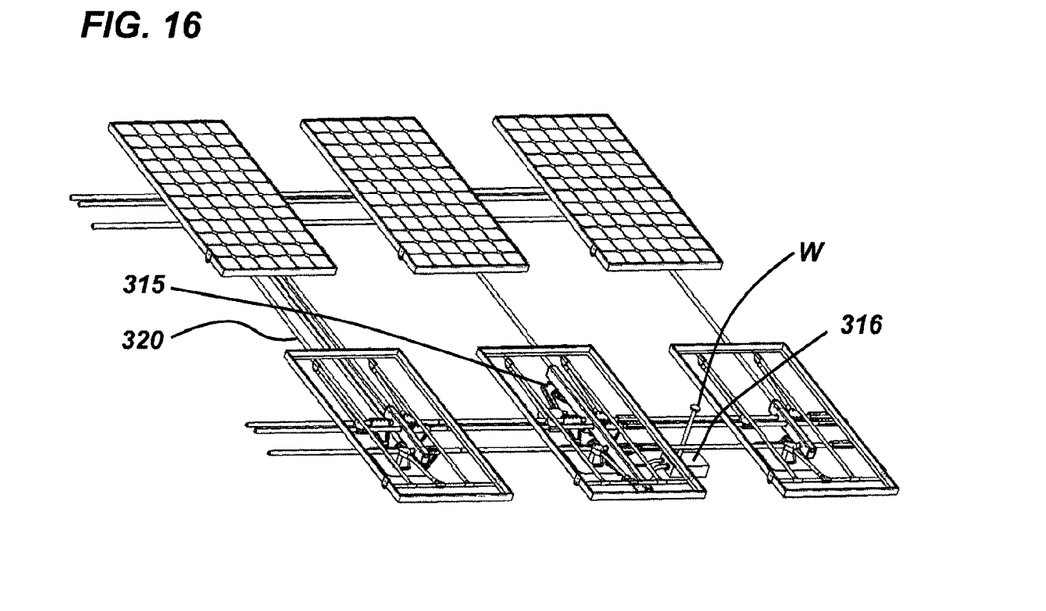
FIG. 16 is a perspective view of an embodiment of a group of solar tracking assemblies of the system illustrated in FIG. 13, and shows a typical location of a driving bearing beam assembly for the system.
Figure 19:
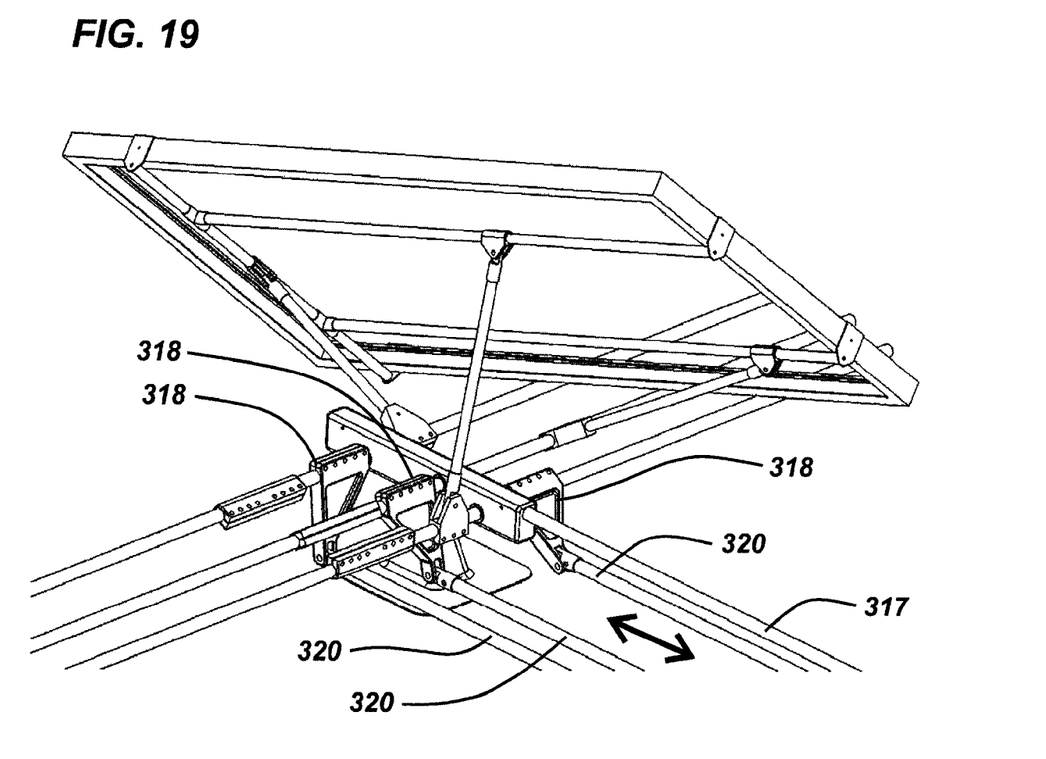
FIG. 19 is a perspective view of of an embodiment of a solar tracking assembly of the system illustrated in FIG. 13, and shows details of a set of extra torque arms and connector arms that can be used to drive the rotation of the shafts in a parallel row of PV panels with a panel tilted for a typical afternoon (northern hemisphere) sun.

With reference to FIG. 16, each plane of modules/solar tracking assemblies (e.g., each group of solar tracking assemblies mounted to each roof surface 303 with its unique plane) is driven by at least one driving beam assembly 315 which rotates all three shafts 307. The three shafts 307 of parallel rows of PV panels 301 can be driven by additional driving beam assemblies 315 or by three interconnecting link arms 320 pushing or pulling against another set torque arms 318 on each parallel row as shown in greater detail in FIG. 19. A control processor 316 controls any number of planes of arrays (e.g., groups of modules/solar tracking assemblies). The control processor 316 is programmed to follow the sun based on calculations based on one or more of location, orientation, roof pitch, and other parameters of the installation.

With reference to FIG. 18, each rotary shaft 307 uses a torque arm 318 and motorized linear actuator 319 to rotate the rotary shaft 307 to the commanded position based on calculated positions from the control processor 316.

In one or more embodiments of the system 300, a high wind sensor W is used to command the system 300 to retract to its stronger, flat, down, low position (FIG. 14) when excessive winds are present.

Thus, the rooftop-mounted solar tracking and mounting systems are ideally suited for installation on the pitched or flat roofs of residential houses or industrial buildings. The solar tracking assemblies are interconnected in a modular adaptable fashion which allows installations to be configured in different shapes depending on each roof and/or any roof penetrations or obstructions that it might have. The plurality of solar tracking assemblies that carry the photovoltaic panel(s) slowly steer the panel(s) to more often directly face the sun as it moves across the sky daily and through the annual seasons. As a result, the solar tracking and mounting systems create significantly more electricity from the sunlight than if the panels were mounted in a fixed position.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. A solar tracking system for mounting on a roof having one or more rooftop planar surfaces, comprising:

an array of solar tracking assemblies for at least one of the one or more rooftop planar surfaces, each array of solar tracking assemblies mountable at substantially the same orientation on the rooftop planar surface, each solar tracking assembly including a mounting structure, a steering mechanism, and one or more energy converting units that convert solar energy into electrical energy, the steering mechanism supported at least in part by the mounting structure and the one or more energy converting units steered by the steering mechanism;

a drive mechanism that drives multiple steering mechanisms of the array of solar tracking assemblies; and a control processor that controls the drive mechanism so that the one or more energy converting units follow the sun, wherein the steering mechanism includes three parallel rotary shafts providing two rotational degrees of freedom and a translational degree of freedom up and down of the one or more energy converting units.

2. The solar tracking system of claim 1, wherein the control processor is programmed to drive the drive mechanism so that the one or more energy converting units follow the sun, the control processor is programmed based on calculations based on at least one of location, orientation, roof pitch, other installation parameters, and sun angle sensor that finds the true instantaneous angle of incidence of the sun without requiring pre-programming of the solar tracking system's location or orientation.

3. The solar tracking system of claim 1, wherein the roof includes a roof support structure, and the mounting structure at least partially supports the solar tracking assembly and connects to the roof support structure.

4. The solar tracking system of claim 1, wherein the steering mechanism is configured to steer the one or more energy converting units into a position so that the one or more energy converting units are parallel with the rooftop planar surface and the solar tracking system further including a wind sensor that senses a high-wind condition in communication with the control processor, and the control processor drives the drive mechanism so that the one or more energy converting units are translated down along the translational degree of freedom from a first up position to a second down position parallel with and substantially adjacent to the rooftop planar surface upon detection of a high-wind condition.

5. The solar tracking system of claim 1, wherein the drive mechanism includes multiple elongated shafts extending between solar tracking assemblies and imparting movement on the multiple steering mechanisms of the array of solar tracking assemblies to steer the one or more energy converting units.

6. The solar tracking system of claim 5, wherein the multiple elongated shafts define a plane that is parallel with the rooftop planar surface.

7. The solar tracking system of claim 1, wherein the solar tracking system is mountable on both pitched and flat roofs of houses and buildings.

8. The solar tracking system of claim 1, wherein the solar tracking assemblies are interconnected in a modular adaptable fashion, allowing installations to be configured in different shapes in two dimensions depending on one or more of the roof configuration, roof penetrations, and roof obstructions.

9. The solar tracking system of claim 1, wherein the solar tracking system includes multiple arrays of solar tracking assemblies, one array for each rooftop planar surface.

10. The solar tracking system of claim 1, wherein the control processor drives the drive mechanism so that the one or more energy converting units are translated down along the translational degree of freedom from a first up position to a second down position parallel with and substantially adjacent to the rooftop planar surface.

* * * * *